US008692995B2

United States Patent
Barth

(10) Patent No.: US 8,692,995 B2
(45) Date of Patent: Apr. 8, 2014

(54) OPTICAL SYSTEM FOR PROJECTING AN IR OR UV TEST SIGNAL WITH OPTICAL ALIGNMENT OF THE PROJECTION AXIS IN THE VISIBLE SPECTRAL REGION

(75) Inventor: Jochen Barth, Oberschleissheim (DE)

(73) Assignee: EADS Deutschland GmbH, Ottobrunn (DE)

( * ) Notice: Subject to any disclaimer, the term of this patent is extended or adjusted under 35 U.S.C. 154(b) by 597 days.

(21) Appl. No.: 12/865,640

(22) PCT Filed: Jan. 19, 2009

(86) PCT No.: PCT/DE2009/000055
§ 371 (c)(1),
(2), (4) Date: Oct. 21, 2010

(87) PCT Pub. No.: WO2009/094979
PCT Pub. Date: Aug. 6, 2009

(65) Prior Publication Data
US 2011/0026012 A1    Feb. 3, 2011

(30) Foreign Application Priority Data
Feb. 1, 2008 (DE) .......................... 10 2008 007 101

(51) Int. Cl.
G01B 11/00 (2006.01)
G01C 1/00 (2006.01)
G01B 11/26 (2006.01)
G06M 7/00 (2006.01)

(52) U.S. Cl.
USPC ........ 356/399; 356/139; 356/153; 250/241.1; 250/221

(58) Field of Classification Search
USPC ................ 356/399, 139, 153; 250/214.1, 221
See application file for complete search history.

(56) References Cited

U.S. PATENT DOCUMENTS

| 3,974,383 A | 8/1976 | Chapman |
| 4,038,547 A | 7/1977 | Hoesterey |
| 4,629,295 A * | 12/1986 | Vogl .............................. 359/364 |

(Continued)

FOREIGN PATENT DOCUMENTS

GB    2 428 929 A    2/2007

OTHER PUBLICATIONS

Roth, T et al., Test projectors to demonstrate the performance of IR missile warning sensors, Proceedings of SPIE, 2008, pp. 71130U-1-71130U-10, vol. 7113, XP002538869.
Robinzon, R et al., Infrared scene generator for a flight motion simulator, Proceedings of the SPIE, 1993, pp. 150-160, vol. 2020, XP002538870.

(Continued)

Primary Examiner — Gregory J Toatley
Assistant Examiner — Sunghee Y Gray
(74) Attorney, Agent, or Firm — Crowell & Moring LLP

(57) ABSTRACT

An optical system for testing IR or UV sensors, comprises input optics, output optics having a reticule disposed on the associated optical axis, a radiation source which emits radiation in the visual spectral region and in the infrared or ultraviolet spectral regions, and a beam splitter for simultaneously visualizing an object scene illuminated by the radiation source with the reticule through the output optics into the eye of an observer. The input optics comprise a lens, the imaging properties of which in the visual spectral region are equal to the imaging properties in the infrared or ultraviolet spectral region, and the beam splitter is a dichroic beam splitter.

5 Claims, 4 Drawing Sheets

(56) References Cited

U.S. PATENT DOCUMENTS

| | | | | |
|---|---|---|---|---|
| 5,031,976 A | * | 7/1991 | Shafer | 359/355 |
| 5,084,780 A | * | 1/1992 | Phillips | 359/350 |
| 5,194,986 A | | 3/1993 | Carlson et al. | |
| 5,469,299 A | * | 11/1995 | Nagano | 359/661 |
| 6,451,507 B1 | * | 9/2002 | Suenaga et al. | 430/311 |
| 2003/0063393 A1 | * | 4/2003 | Omura | 359/649 |

OTHER PUBLICATIONS

Barth, J et al., Anti-tank missile system MILAN: Optronic sensors for the new generation firing post MILAN ADT/ER, Proceedings of SPIE, 2007, pp. 654239-1-654239-9, vol. 6542, XP002538871.
International Search Report with English translation dated Sep. 9, 2009 (six (6) pages).

* cited by examiner

OPTICAL SYSTEM FOR PROJECTING AN IR OR UV TEST SIGNAL WITH OPTICAL ALIGNMENT OF THE PROJECTION AXIS IN THE VISIBLE SPECTRAL REGION

This application is a national stage of PCT International Application No. PCT/DE2009/000055, filed Jan. 19, 2009, which claims priority under 35 U.S.C. §119 to German Patent Application No. 10 2008 007 101.3, filed Feb. 1, 2008, the entire disclosure of which is herein expressly incorporated by reference.

BACKGROUND AND SUMMARY OF THE INVENTION

The present invention relates to an optical system for testing infrared or ultraviolet sensors.

An increasing number of optical sensors use spectral regions outside that of visible light. Examples include warning sensors which are intended to discover incoming rockets by using the optical signature in the ultraviolet or in the infrared spectrum. Such sensors register a large spatial angle range and, if a risk is detected, are also intended to specify the direction of the threat in order that countermeasures can be initiated specifically.

In order to test such sensors, an optical test signal is generated in the appropriate spectral region and projected into the aperture of the sensor. Here, precise alignment of the projection axis may be required, for example in order to determine the resolution and accuracy of the directional information output or in order to direct a highly focused test signal precisely onto the sensor aperture even from a relatively great distance. The latter is the case when a sensor in the installed state outside the laboratory must be stimulated from a relatively large distance for test purposes because of restricted accessibility.

According to related techniques, axial alignment of a test projector is achieved by a "two-eyed" optical arrangement, in which a projector and a telescope are constructed separately from each other. Commercial systems for sensor stimulation are offered under the designation "Barringas", for example by companies like CI Systems or Polytec.

Before the use of such a test projector, it is necessary first to align the two optical axes of projector and telescope parallel to each other. To this end, as a rule the telescope is aligned with a sensor set up at a suitable distance, and the optical axis of the projector is adjusted to maximize the sensor signal. The accuracy of the axial alignment that can be achieved in this way is limited, and is inadequate for a test of the directional resolution of a warning sensor.

A higher accuracy can be achieved during the adjustment of the optical axes by means of autocollimation with the aid of a suitable test reflector. However, this requires the replacement of the radiation source in the projector by a suitable detector which is sensitive in the spectral region of the projector. Such detectors are generally very expensive, in particular if a cooled IR detector is necessary. For this method, the accuracy of the alignment is limited by the accuracy of the test reflector, since it is struck by the two beam paths in two different regions, the reflective surfaces of which beam paths must ideally be parallel to each other.

One object of the present invention, therefore, is to provide an arrangement which is compact and easy to handle, and with which it is possible to test the directional resolution of an IR or UV sensor and to stimulate such a sensor with a test signal with optimal intensity, even from a great distance.

This and other objects and advantages are achieved by the optical system according to the invention, which comprises input optics, output optics having a reticule disposed on the associated optical axis, a radiation source which emits radiation intensity in the visual spectral region and in the infrared or ultraviolet spectral region, and a beam splitter for simultaneously visualizing an object scene illuminated by the radiation source with the reticule through the output optics, into the eye of an observer. The input optics comprise a lens, the imaging properties of which in the visual spectral region are equal to its imaging properties in the infrared or ultraviolet spectral region, and the beam splitter is a dichroic beam splitter.

The input optics are divided by the beam splitter into two separate beam paths having two image planes. In the image plane of one beam path (telescope), the image of an observed object scene in the visual spectral region coincides with the reticule disposed in this image plane to mark the optical axis, and is presented to an observer through the output optics for consideration. In the beam path of the other image plane (projector), the radiation source is disposed on the optical axis.

Therefore, the optical arrangement combines the beam paths of the projector and of the telescope via the beam splitter in such a way that the input optics, which are advantageously formed as a bi-spectral lens, are used jointly.

The bi-spectral lens of the input optics is expediently formed as an achromat, the chromatic correction state of which minimizes the secondary spectrum in the two spectral regions used. If, in addition to the visual region for the optical axial alignment, the IR region is used for the projection of the test signal, this correction state is achieved, for example, by means of a positive $CaF_2$ lens and a negative LiF lens.

Other objects, advantages and novel features of the present invention will become apparent from the following detailed description of the invention when considered in conjunction with the accompanying drawings.

DETAILED DESCRIPTION OF THE DRAWINGS

Figure 1:
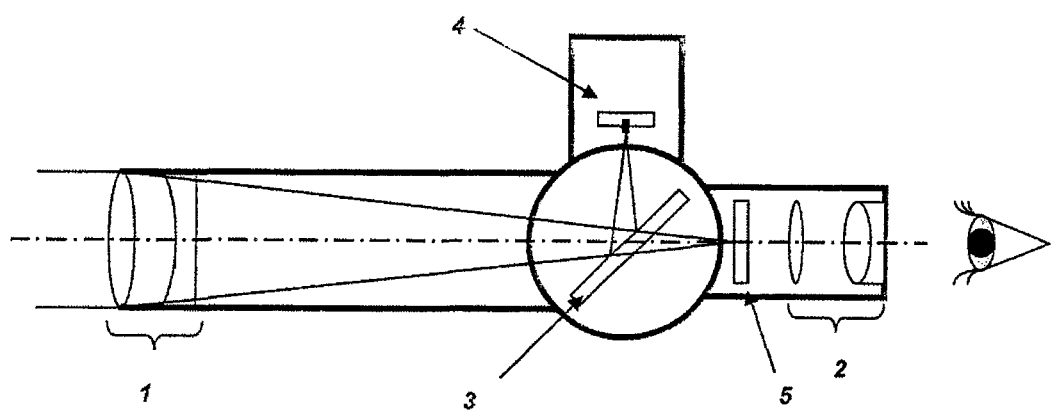
FIG. 1 shows a first embodiment of an optical system according to the invention.

FIG. 1 shows a first embodiment of an optical system according to the invention, which includes a telescope having a bi-spectral lens as input optics 1 and output optics 2 (eyepiece). In the intermediate image plane, a reticule 5 is inserted as a graticule for marking the optical axis and, secondly, a projector having the same input optics 1 and a radiation source 4. The two beam paths are separated by the beam splitter 3, arranged behind the input optics as seen from the object space, in the form of a dichroic beam splitter plate. This arrangement is more compact than the prior art "two-eyed" structure described above, and has the advantage that the alignment of the two optical axes in relation to each other can be measured particularly simply and precisely. From the object space, both image planes of the input optics can be observed simultaneously in the visual spectral region by an observer using an auxiliary telescope.

Figure 2:
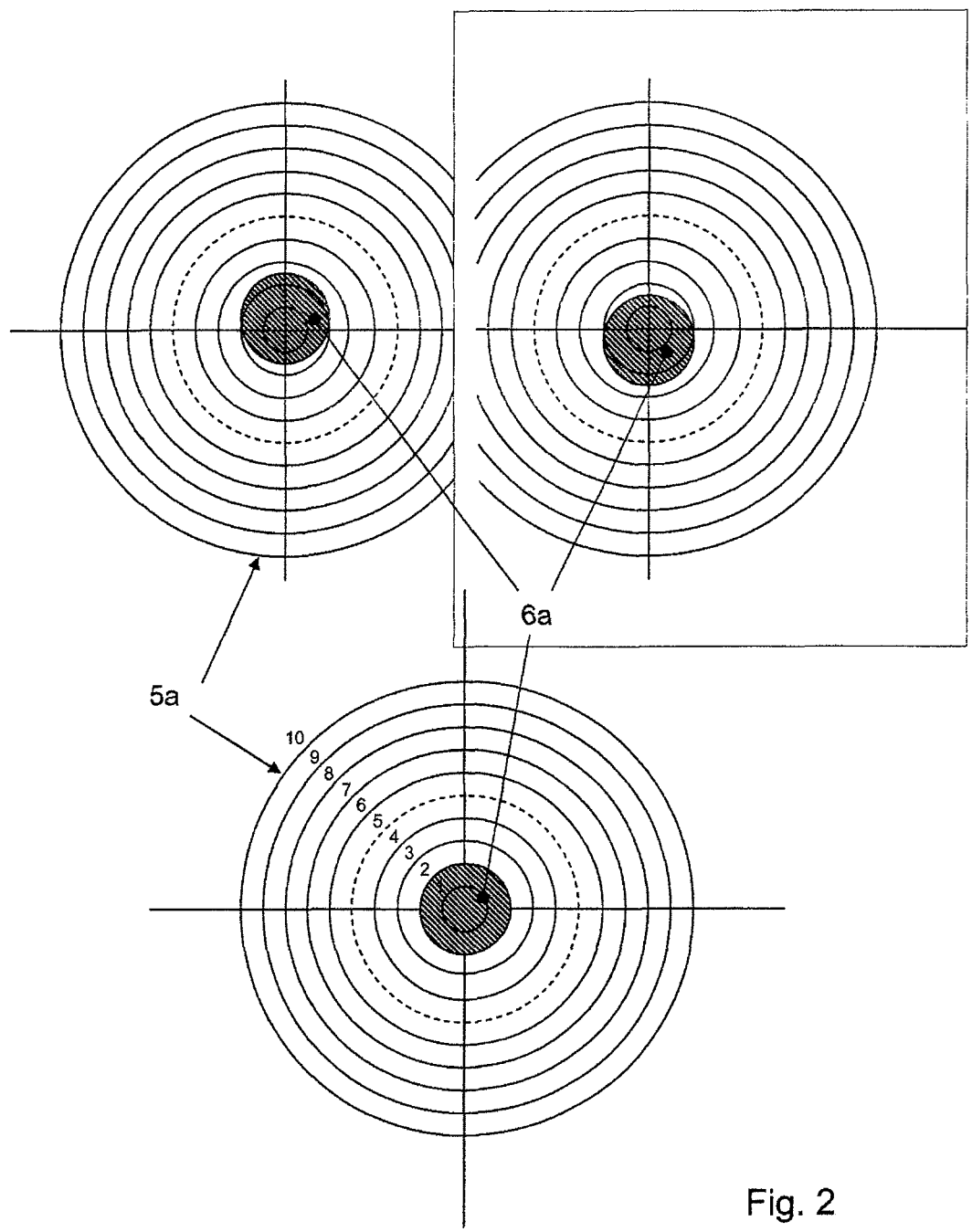
FIG. 2 is an illustration relating to the axial alignment of the optical system according to FIG. 1.

FIG. 2 shows an example of the image of the two superimposed image planes which is presented to the observer: the concentric rings and the cross hairs 5a originate from a graticule, and the hatched circle 6a shows the image of a radiation source having a round emitting surface. The two optical axes are adjusted optimally in relation to each other when the hatched circle is centered with respect to the rings and the cross hairs.

The precision of the measuring method depends on the focal length of the lens and the local resolution achieved in the intermediate image plane at the location of the graticule 5. Accuracies of considerably better than 1 mrad can thus easily be achieved.

As an advantageous design of the optical system according to the invention, the radiation source may be supplemented by an aperture stop in the image plane of the input optics, in order to facilitate the centering of the emitting surface in relation to the figure of the graticule.

If the emitting surface of the radiation source is considerably larger than the aperture of the aperture stop, the adjustment of the axial parallelism is independent of the exact position of the radiation source, so that the latter can be replaced without difficulty. It is therefore possible to divide the requirement on the radiation source, to cover both spectral regions used, between two different radiation sources, which are used alternatively.

The optical structure according to the invention comprises an IR or UV projection beam path, the optical axis of which can be aligned visually and precisely via the telescope likewise contained in the structure. In particular, this is possible with the aid of autocollimation on a reflective reference surface, since all the constituent parts of an autocollimation telescope are also contained in the structure.

Autocollimation is a known optical method in which an image or a hair line is projected onto itself such that it can be observed. It provides is a sensitive method in order to determine small directional or inclination errors, and is generally carried out by using an autocollimation telescope (autocollimator) set to infinity and a mirror (object scene). The accuracy of this measuring method is independent of the distance between the mirror (object scene) and autocollimator.

A bi-spectral lens for the projection of IR radiation in the region from 3 µm to 5 µm wavelength can be built up from a positive CaF2 lens and a negative LiF lens. By using this lens, chromatic correction of IR optics is possible, which leads to a comparatively good state of correction in the central IR region and at least in part of the visible spectral region (achromat). By means of adding a ZnSe lens having a long negative focal length, the chromatic correction can be improved still further (apochromat).

In the structure according to the invention, by using the objective, and through autocollimation in red light, axial alignment of the projector (formed from light source 4 with aperture stop, beam splitter 3 and lens 1) is performed in relation to a reference surface (not shown).

Dichroic beam splitters are also known. They are normally produced by multilayer layering in standard coating processes on optical glasses or else CaF2 (then transparent to IR), or by using modern "ion plating" technology on temperature-resistant substrates such as sapphire or else undoped YAG crystal.

The dichroic beam splitter should have the following characteristics: high transmittance in the spectral range of the projector, in the visual spectral region a ratio between transmittance and reflectance approximately in the range from 0.1 to 10 can be used with the lowest possible loss by absorption and, in order to minimize the astigmatism in the transmitted beam path, the beam splitter substrate should be as thin as possible. By dividing up the reflection and transmission requirements between front and rear side, disruptive double images can be avoided. Reflection and transmission properties of the beam splitter can also be interchanged with each other in such a way that the components comprising graticule 5 and eyepiece 2, on the one hand, and aperture 6 and light source 4, on the other hand, can exchange places.

To illuminate the aperture 6, either two separate light sources (for example, a red light-emitting diode and a black radiating body) can be used, which have to be interchanged with each other, depending on the application, without changing the alignment of the aperture; or it is possible for an IR source to be used which is heated to about 500° C. to 700° C., so that the red glow in the visible spectral region can be used.

For the purpose of axial adjustment in autocollimation, the combination of a round aperture stop 6 with an eyepiece graticule 5 which contains a pattern of concentric rings, as shown in FIG. 2, is advantageous. In the image in the eyepiece, the operator compares the position of the image 6a of the aperture, as illuminated in the red light from the light source 4, with the pattern 5a of the graticule. The aim of any adjustment is to align the image 6a (hatched region) of the aperture centrally in relation to the pattern of lines 5a.

First, the axes of the collimator are adjusted in relation to each other by lateral alignment of the aperture 6; for example a retro reflector of high precision may be positioned in front of the lens 1, or, as already explained above, aperture 6 and graticule 5 may be observed through a telescope (not illustrated) positioned in front of the lens 1. Once the autocollimator has been adjusted on its own, it is aimed at a reflective, flat reference surface (not illustrated) and adjusted in terms of azimuth and elevation angle. Once the central alignment of the aperture image has again been achieved by means of this adjustment, then the optical axis of the autocollimator—and therefore also that of the projector—is perpendicular to the plane of the reference surface.

Figure 3:
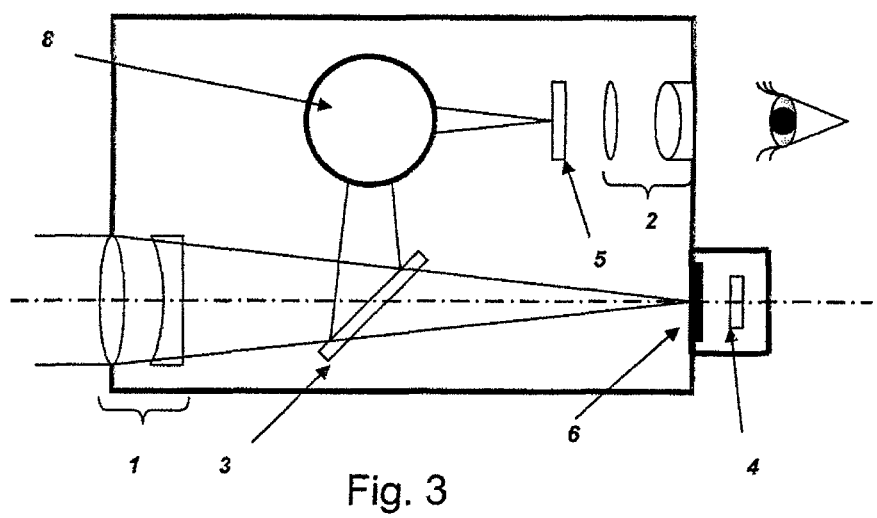
FIG. 3 shows a first embodiment of an optical system having image erection according to the invention.

If the IR or UV projection beam path is to be aligned visually, by using the telescope, with the aperture of a sensor positioned at a relatively great distance, it is helpful to the user if the observed object scene is reproduced upright and laterally correctly in the eyepiece. FIG. 3 shows a first embodiment of an optical system according to the invention having image alignment.

The optical system here comprises a telescope, which contains input optics 1 having a bi-spectral lens, output optics 2 (eyepiece), a beam splitter 3 in the form of a dichroic beam splitter plate, and an IR radiation source 4. In the beam path between the output optics 2 and the input optics 1 there are optical means 8 for the laterally correct and upright reproduction of the observed object scene; in addition, the exit axis of the optical beam path is parallel to the entry axis. The IR radiation source 4 is expediently arranged on the optical axis of the object 1. Therefore, visual axial alignment of the optical axis of the lens 1 with the object scene is possible.

The means 8 used to erect the image can be, for example, a penta prism having a roof-shaped edge or a combination of various prisms and/or mirrors.

Figure 4:
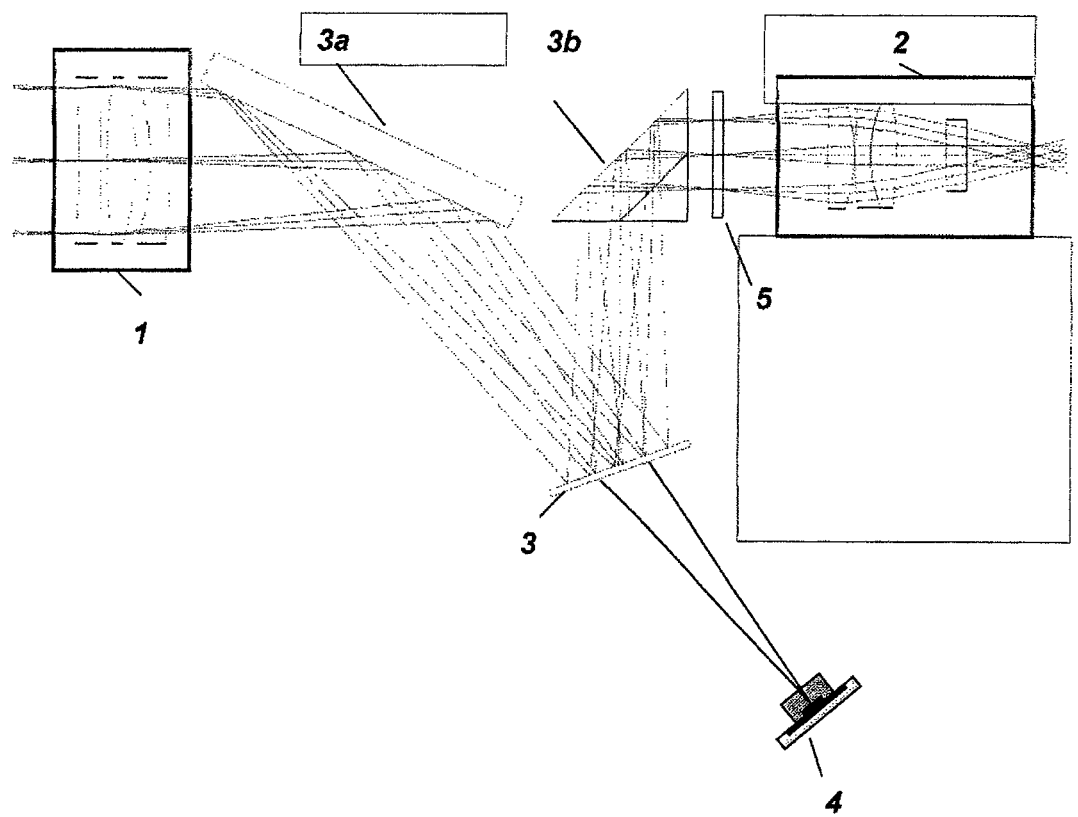
FIG. 4 shows a second embodiment of an optical system having image erection according to the invention.

FIG. 4 shows a specific embodiment of an optical system having image erection. This optical system likewise has input optics 1 with a bi-spectral lens, output optics 2 (eyepiece), a beam splitter 3 in the form of a dichroic beam splitter plate and an IR radiation source 4. In the beam path between lens 1 and beam splitter 3 there is a deflection mirror 3a. In the beam path between the beam splitter 3 and the eyepiece 2 there is an amici prism 3b with a roof-shaped edge. In this case, the deflection mirror 3a is used for the image erection and the amici prism 3b is used for the laterally correct reproduction of the observed object scene.

In the optical system illustrated in FIG. 4, the visual optical channel is used, as with a target telescope, to register the aperture of an IR sensor (not illustrated) to be stimulated, which is located at a relatively great distance. It is therefore possible, for example, for the function of an IR rocket warning sensor on an aircraft to be tested by a member of the ground personnel stimulating the sensor with an IR test signal ("Flight Line Tester").

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An optical system for testing IR or UV sensors, comprising:
   input optics;
   output optics having a reticle disposed on an associated optical axis;
   a radiation source, which emits radiation in both the visual and infrared or ultraviolet spectral regions; and
   a beam splitter for simultaneously visualizing an object scene illuminated by the radiation source with the reticule through the output optics into the eye of an observer; wherein,
   the input optics comprise a bi-spectral lens comprising a positive $CaF_2$ lens and a negative LiF lens, the bi-spectral lens having imaging properties which, in the visual spectral region, are the same as the imaging properties in the infrared or ultraviolet spectral region; and
   the beam splitter is a dichroic beam splitter.

2. The optical system as claimed in claim 1, wherein:
   the radiation source comprises two alternatively used sources;
   one of said sources emits radiation in the visual spectral region; and
   the other of said sources emits radiation in the infrared or ultraviolet spectral region.

3. The optical system as claimed in claim 1, wherein an aperture stop is centered on the optical axis of the radiation source.

4. The optical system as claimed in claim 1, wherein the optical system comprises
   a telescope which, in the beam path between the output optics and the input optics, has optical apparatus for the laterally correct and upright reproduction of the observed object scene.

5. The optical system as claimed in claim 3, wherein:
   a deflection mirror is disposed between the input optics and beam splitter; and
   an amici prism having a roof-like edge is disposed between the beam splitter and output optics.

* * * * *